US008702977B2

(12) United States Patent
Shah et al.

(10) Patent No.: US 8,702,977 B2
(45) Date of Patent: Apr. 22, 2014

(54) WATER DISTRIBUTION SYSTEM

(75) Inventors: Anand Shah, Ahmedabad (IN); Naman Shah, Palm Bay, FL (US); Sameer Kalwani, Irvine, CA (US)

(73) Assignee: Piramal Enterprises Limited, Mumbai (IN)

(*) Notice: Subject to any disclaimer, the term of this patent is extended or adjusted under 35 U.S.C. 154(b) by 277 days.

(21) Appl. No.: 13/110,825

(22) Filed: May 18, 2011

(65) Prior Publication Data
US 2011/0284433 A1 Nov. 24, 2011

Related U.S. Application Data

(60) Provisional application No. 61/376,766, filed on Aug. 25, 2010, provisional application No. 61/346,895, filed on May 20, 2010.

(51) Int. Cl.
*B01D 17/12* (2006.01)
*B01D 35/14* (2006.01)
*B01D 35/02* (2006.01)

(52) U.S. Cl.
USPC ............. 210/85; 210/86; 210/87; 210/90; 210/94; 210/103; 210/134; 210/137; 210/143; 210/257.1; 210/259; 222/23; 222/36; 222/52; 222/189.06; 700/273

(58) Field of Classification Search
USPC .......... 210/85, 87, 90, 96.1, 100, 143, 241, 210/259, 86, 94, 97, 103, 134, 137, 257.1, 210/257.2; 222/23, 36, 52, 189.06; 700/231, 232, 240, 241, 266, 273; 705/1.1, 15
See application file for complete search history.

(56) References Cited

U.S. PATENT DOCUMENTS

| 4,801,375 A | * | 1/1989 | Padilla .................... 210/100 |
| 4,830,757 A | * | 5/1989 | Lynch et al. ............... 210/742 |
| 5,112,477 A | * | 5/1992 | Hamlin ..................... 210/85 |
| 5,191,613 A | | 3/1993 | Graziano et al. |
| 5,494,573 A | * | 2/1996 | Schoenmeyr et al. ........ 210/94 |
| 5,646,863 A | | 7/1997 | Morton |
| 5,654,201 A | | 8/1997 | Capuano |
| 5,817,231 A | * | 10/1998 | Souza ....................... 210/96.2 |
| 5,865,991 A | * | 2/1999 | Hsu ........................... 210/87 |

(Continued)

*Primary Examiner* — Joseph Drodge
(74) *Attorney, Agent, or Firm* — Klarquist Sparkman, LLP

(57) ABSTRACT

A water distribution system configured for control by a remote control system is disclosed comprising of a water filtration unit for filtering water and a water storage unit for storing the filtered water and including a water dispenser. A control unit is provided that is configured to control the operation of the water filtration unit and includes a sensor system to measure the quality and the quantity of the water filtered, and to monitor the functioning of one or more components of the water filtration unit. A point of sale device is also provided comprising of a service management device mounted on the water dispenser and is configured to control the operation of the water dispenser and a user interface to receive user inputs and is configured to process user payments for the dispensing of water at the remote control system. The system includes a communication gateway enabling communication between the water distribution system and the remote control system such that the water distribution system is configured to transmit data obtained from the sensor system and the user interface to the remote control system. The water distribution system is further configured to receive instructions for the operation of the water filtration unit from the remote control system and to receive instructions for dispensing of water on successful processing of user payment.

22 Claims, 5 Drawing Sheets

(56) References Cited

U.S. PATENT DOCUMENTS

| | | |
|---|---|---|
| 6,024,867 A | 2/2000 | Parise |
| 6,496,752 B2 * | 12/2002 | Sudolcan et al. .............. 700/239 |
| 6,626,042 B2 * | 9/2003 | Havlena ........................... 73/702 |
| 6,753,186 B2 | 6/2004 | Moskoff |
| 6,880,566 B2 * | 4/2005 | Newman ....................... 137/377 |
| 7,454,295 B2 * | 11/2008 | Wolfe .............................. 702/22 |
| 7,497,957 B2 * | 3/2009 | Frank ............................. 210/739 |
| 7,891,235 B2 * | 2/2011 | Chowdhury ................. 73/61.71 |
| 8,201,736 B2 * | 6/2012 | Doglioni Majer ............ 235/383 |
| 2005/0009192 A1 * | 1/2005 | Page ............................... 436/55 |
| 2007/0125795 A1 * | 6/2007 | Emes et al. ....................... 222/2 |
| 2008/0289402 A1 * | 11/2008 | Chowdhury ................. 73/61.71 |
| 2009/0045256 A1 * | 2/2009 | McInerney et al. ........... 235/381 |

* cited by examiner

WATER DISTRIBUTION SYSTEM

CROSS-REFERENCE TO RELATED APPLICATIONS

The present application claims the benefit of U.S. Provisional Application No. 61/346,895, filed on May 20, 2010, and U.S. Provisional Application No. 61/376,766, filed on Aug. 25, 2010, both of which are hereby incorporated herein by reference in their entirety.

BACKGROUND

An estimated 850 million people today lack access to potable drinking water, a crisis responsible for half of all hospitalizations for illness in the developing world. The great majority of this population lives in villages or urban slums, without access to piped household water supply. Today, municipal water utilities are the only water distribution systems that systematically and remotely track water quality and quantity in close to real-time. Extending this kind of "on-grid" infrastructure to reach underserved populations is cost prohibitive. No "off-grid" systems exist that track water filtration and dispensing from the raw water source to the service outlet. In addition, it is now widely accepted that collecting payment for public water provision is critical for the continued financial viability and quality of the distribution system.

Several attempts have been made to address these problems. Such water dispensing systems range from simple and inexpensive to sophisticated and expensive. Such water dispensing systems depend on human intervention for machine maintenance, service and maintenance of quality standards. These issues are further compounded in rural environments. The ability to collect payment on use of services is a great barrier to expanding the reach of water utility infrastructure, especially in emerging markets. Service providers, particularly in the case of potable water, lack the ability to assure that the services meet World Health Organization standards for potable water. Remote monitoring systems such as that disclosed in U.S. Pat. No. 6,753,186, while allowing users to track quality of water, do not offer a system capable of preventive maintenance or ability to process payments. To provide a consistent service, the equipment must be sufficiently manageable. Physical proximity to machinery is often the only way to make adjustments. In a distributed system, the costs of getting to equipment to change settings can render the entire proposition financially unviable.

There is, therefore a need for an autonomous water dispensing system that provides for remote, decentralized tracking and control of water filtration, quality and dispensing from source-to-service. Also, there is a further need for this system to able to manage payment collection on service usage and provide preventive maintenance as needed.

SUMMARY

A water distribution system configured for control by a remote control system is disclosed. The water distribution system comprises of a water filtration unit for filtering water and a water storage unit for storing the filtered water and including a water dispenser. The water distribution system further comprises of a control unit that is configured to control the operation of the water filtration unit and includes a sensor system to measure the quality and the quantity of the water filtered, and to monitor the functioning of one or more components of the water filtration unit. The water distribution system further comprises of a point of sale device comprising of a service management device mounted on the water storage unit and is configured to control the operation of the water dispenser and a user interface to receive user inputs and is configured to process user payments for the dispensing of water at the remote control system. The water distribution system further comprises of a communication gateway enabling communication between the water distribution system and the remote control system such that the water distribution system is configured to transmit data obtained from the sensor system and the user interface to the remote control system. The water distribution system is further configured to receive instructions for the operation of the water filtration unit from the remote control system and to receive instructions for dispensing of water on successful processing of user payment.

A water distribution system configured for control by a remote control system is disclosed. The water distribution system comprises of a water filtration unit for filtering water and a water storage unit for storing the filtered water and including a water dispenser. The water distribution system further comprises of a control unit configured to control the operation of the water filtration unit. The control unit comprises of a sensor system to measure the quality and the quantity of the water filtered and to monitor the functioning of one or more components of the water filtration unit and a communication module for communication with the remote control system and configured to transmit data obtained from the sensor system to the remote control system and to receive instructions for the operation of the water filtration unit from the remote control system. The water distribution system further comprises of a point of sale device. The point of sale device comprises of a service management device mounted on the water dispenser and configured to control the operation of the water dispenser, a communication module for communication with the remote control system and a user interface to receive user inputs and configured to process user payments for the dispensing of water at the remote control system through the communication module such that the point of sale device is configured to instruct the service management device to dispense water through the water dispenser on successful processing of user payment.

A system for distribution of water is disclosed. The said system comprises a remote control system for collecting data and aggregating information from one or more remotely located water distribution system in communication with the remote control system. The system further comprises of a water filtration unit for filtering water and a water storage unit for storing the filtered water and including a water dispenser. The system further comprises of a control unit configured to control the operation of the water filtration unit and including a sensor system to measure the quality and the quantity of the water filtered, and to monitor the functioning of one or more components of the water filtration unit. The system further comprises of a point of sale device comprising a service management device mounted on the water storage unit and configured to control the operation of the water dispenser and a user interface to receive user inputs and configured to process user payments for the dispensing of water at the remote control system. The system further comprises of a communication gateway enabling communication between the water distribution system and the remote control system such that the water distribution system is configured to transmit data obtained from the sensor system and the user interface to the remote control system. The water distribution system is further configured to receive instructions for the operation of the water filtration unit from the remote control system, and to receive instructions for dispensing of water on successful processing of user payment.

DETAILED DESCRIPTION

Figure 1:
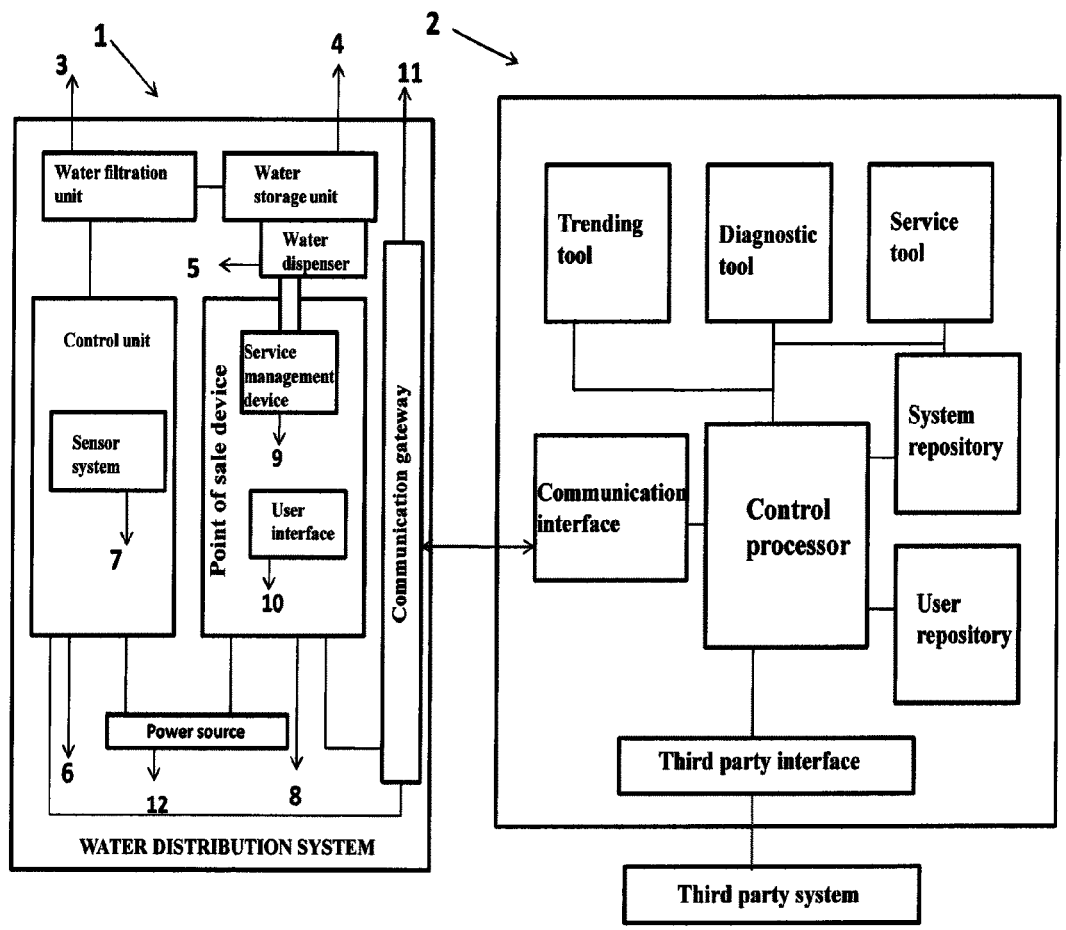
FIG. 1 is a schematic illustration of a water distribution system in accordance with an embodiment of the invention.

For the purpose of promoting an understanding of the principles of the invention, reference will now be made to various alternative embodiments and specific language will be used to describe the same. It will nevertheless be understood that no limitation of the scope of the invention is thereby intended, such alterations and further modifications in the illustrated method, and such further applications of the principles of the invention as illustrated therein being contemplated as would normally occur to one skilled in the art to which the invention relates.

Many of the functional units described in this specification have been labelled as modules, in order to more particularly emphasize their implementation independence. For example, a module may be implemented as a hardware circuit comprising custom very large scale integration circuits or gate arrays, off-the-shelf semiconductors such as logic, chips, transistors, or the other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organised as an object, procedure, or function. Nevertheless, the executables of an identified module need not be physically located together, but may comprise disparate instructions stored in different locations which, when joined together, comprise the module and achieve the started purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different member disks, and may exist, at least partially, merely as electronic signals on a system or network.

Reference throughout this specification to "one embodiment" "an embodiment" or similar language means that a particular feature, structure, or characteristic described in connection with the embodiment is included in at least one embodiment of the present invention. Thus, appearances of the phrase "in one embodiment", "in an embodiment" and similar language throughout this specification may, but do not necessarily, all refer to the same embodiment.

The invention relates to a system for distribution of water for providing and managing purified water distribution services remotely. More particularly, the invention relates to an autonomous water distribution system for control by a remotely located control system. The water distribution system transmits data to the remote control system and receives instructions from the remote control system based on the data received.

FIG. 1 illustrates a water distribution system (1) configured for control by a remote control system (2). The water distribution system (1) comprises of a water filtration unit (3) and a water storage unit (4) for storing the water filtered by the water filtration unit (3). The water storage unit (4) includes a water dispenser (5). The water distribution system (1) also includes a control unit (6) for controlling the operation of the water filtration unit (3). The control unit (6) also includes a sensor system (7) to measure the quality and quantity of the water filtered by the water filtration unit (3) or dispensed by the water dispenser (5), or both. The sensor system (7) also monitors the working of one or more component of the water filtration unit (3) or the water storage unit (4), or both. The water distribution system (1) further includes a point of sale device (8) including a service management device (9) to control the operation of the water dispenser (5) and a user interface (10) for conducting transactions on the water distribution system (1). The user interface (10) includes a payment module configured to receive payment for the water to be dispensed and to process the payments at the remote control system (2). The service management device (9) is mounted on the water dispenser (5) to control the operation of the water dispenser (5). The communication between the water distribution system (1) and the remote control system (2) is enabled by a communication gateway (11). The water filtration unit (3) filters water obtained from a water source which may be a water tank connected to the water distribution system (1).

In accordance with an embodiment, water filtration unit (3) is located remotely from the water storage unit (4). The water storage unit (4) may receive water from one or a plurality of water filtration unit (3). The water filtration unit (3) and the control unit (6) may be located at a separate location from the water storage unit (4) and the point of sale device (8). For example, it may be convenient to have one water filtration unit (3) in a locality that filters water for a plurality of water dispensers (5). Filtered water from the water filtration unit (3) may be transported by pipes, bags, cans or trucks to the water storage unit (4).

The control unit (6) may be a module that is configured to ensure that the water filtration unit (3) and the water dispensed by the water dispenser (5) operate within a given set of parameters. These parameters lead the water filtration unit (3) to operate at a near steady state performance level and are measured by the sensor system (7) which may include gauges or meters or electronic sensors. Parameters include for example, water quality at source, water quality of final product, pressures across membranes, voltage across UV sterilizer, low water pressure switches. In accordance with an embodiment, the sensor system (7) includes a flow sensor, a conductivity sensor, a spectrometer, a pressure sensor or combinations thereof. The sensors deployed may include switches for triggering an automatic response. Based on the signal provided to the control unit (6) it will operate the motors, drives and valves of the water filtration unit (3) to keep the water filtration unit (3) at a steady state. If the control unit (6) is unable to bring the water distribution system (1) within the desired operating conditions, it may be configured to turn off the water distribution system (1). The communication between the sensor system (7) and the control unit (6) may be by hard wires or wireless which passes through a converting circuit. The control unit (6) may be configured with appropriate modules to communicate with any device required by the water filtration unit (4).

In accordance with an embodiment, the remote control system (2) receives data obtained from the sensor system (7) and transmits instructions to the control unit (6) to adjust the operation settings of one or more components of the water filtration unit (3). Data from the sensor system (7) is interpreted by the control unit (6) and transmitted to the remote control system (2). Based on the data measured by the sensor system (7) the remote control system (2) may transmit instructions to the control unit (6) to start or stop the operation of the water filtration unit (3). By way of specific example, if a component of the water filtration unit (3) is functioning outside its required settings, then the remote control system (2) may send instructions to adjust the operation parameter of that component, or any other component of the water filtration unit (3) to bring the water distribution system (1) within the desired settings.

The control unit (6) may be configured to operate the water filtration unit (3) on an on-demand mode or in a batch mode. In case of batch production, the control unit (6) will determine if the level of water is low in the water storage unit (4) through a sensor and send instructions to begin production. Once the batch production process is complete, determined by a timer or sensor, the batch production process will stop. In the case of on demand production, once a user request for dispensing of water is processed, the production will start immediately and will end once the dispensing is complete, or unless an error occurs. In the event of an error the water distribution system (1) will transmit details of the error to the remote control system (2).

The service management device (9) regulates the provisioning of potable water. Upon a consumer transaction at the point of sale device (8), purified water is released to the consumer. The transaction is sent to the remote control system (2) with the transaction information. The point of sale device (8) sends a signal to the service management device (9) to begin provisioning of the services which are released by a source. If the source is unable to provide a quality service (detected by the service management device (9)) the point of sale device (8) will terminate the transaction informing the remote control system (2) accordingly. The service management device (9) may be configured with appropriate modules for regulating the provisioning of water to a user of the water distribution system (1) and ensuring that the quality of the water dispensed meets a predetermined quality standard. On instructions from the point of sale device (8) the service management device (9) dispenses the required amount of water through the water dispenser (5). On completion of transaction, the service management device (9) will shut off the water and may return to an idle mode. The service management device (9) also includes one or more of a sensor to measure the quality of water. The sensors may include sensors for measuring the total dissolved solids in the dispensed water, a flow sensor, a conductivity sensor, a spectrometer, a pressure sensor, a water level sensor to measure water level of the storage unit or a filtration sensor. The sensors deployed may include switches for triggering an automatic response. By way of specific example, the service management device (5) has a regulatory tool to open or close the water dispenser (5), a sensor to measure the quantity of water dispensed and a conductivity meter to measure the quality of water dispensed. The regulatory tool may include a solenoid valve. The sensor measures any impurity in the water. By way of specific example, the sensor may measure the total dissolved solids in the water which includes the amount of bacteria, minerals or any other solid present in water. The total dissolved solid measured by the sensor is compared with a predetermined range that is set locally or remotely. If the total dissolved solid measured by the sensor is outside the predetermined range then the service management device (9) stops the dispensing of water through the water dispenser (5).

Figure 2:
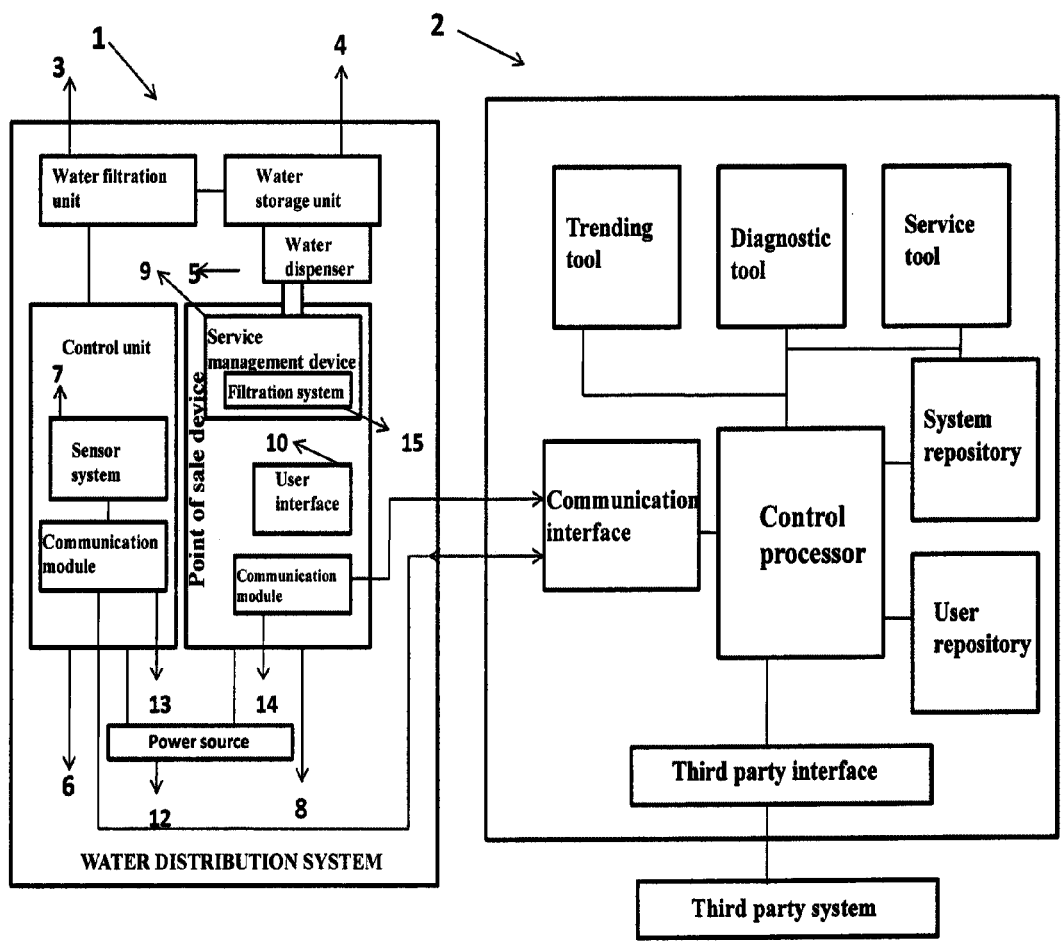
FIG. 2 is a schematic illustration of a water distribution system in accordance with an alternate embodiment of the invention.

In accordance with an embodiment and as illustrated in FIG. 2, the service management device (9) may include a filtration system (15) for additional filtration capability to further filter or treat the water before dispensing. The additional filtration may for example include a UV filter system. The filtration capability of the service management device (9) addresses concerns on the water purity on account of transport from the water filtration unit (3) to the water storage unit (4) or on account of long period of storage in the water storage unit (4).

In one example embodiment, the autonomous water distribution system (1) can be placed throughout the rural landscape to ensure clean water is both accessible and affordable. Pure (potable) water is held in a source, for example, a large storage tank. The tank is connected to a water dispenser (5) that would normally provide the water on its own, without any point of sale device (8) or regulation. The service management device (9) has a regulatory tool (for example, a solenoid valve) to open and close to the water dispenser (5), a measurement tool (for example, a flow sensor) to measure the water dispensed, and a quality tool (for example, a conductivity meter) to measure water quality. In the present example embodiment, these tools make up the service management device (9). The point of sale device (8) connects to the service management device (9) for regulating water dispensing based on payment of fees from users. Also, the point of sale device (8) will dispense water when the water is within the appropriate quality standards.

Figure 3A:
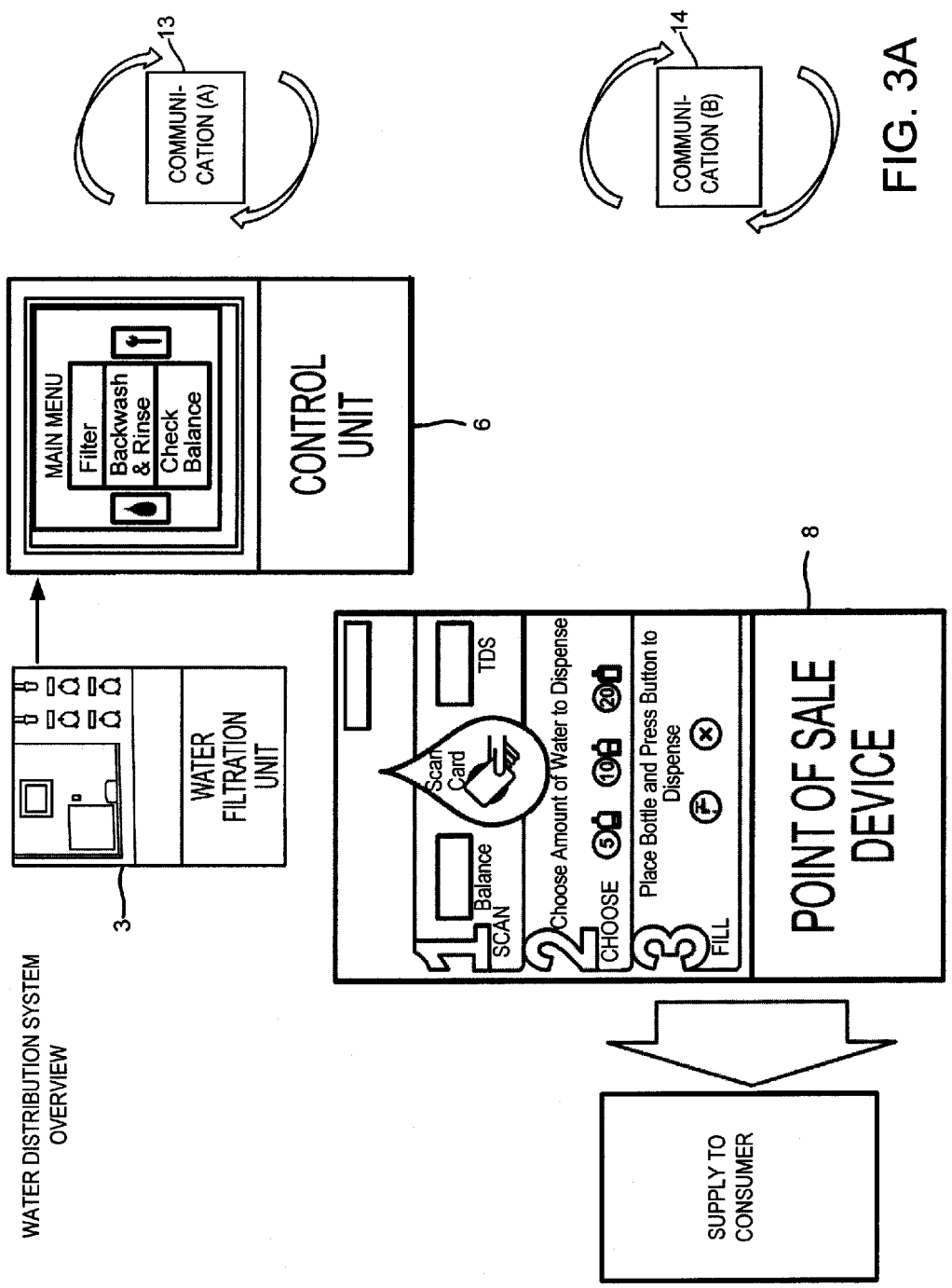
FIGS. 3A and 3B are a schematic illustration of the working of the water distribution system in accordance with an embodiment of the invention.
Figure 3B:
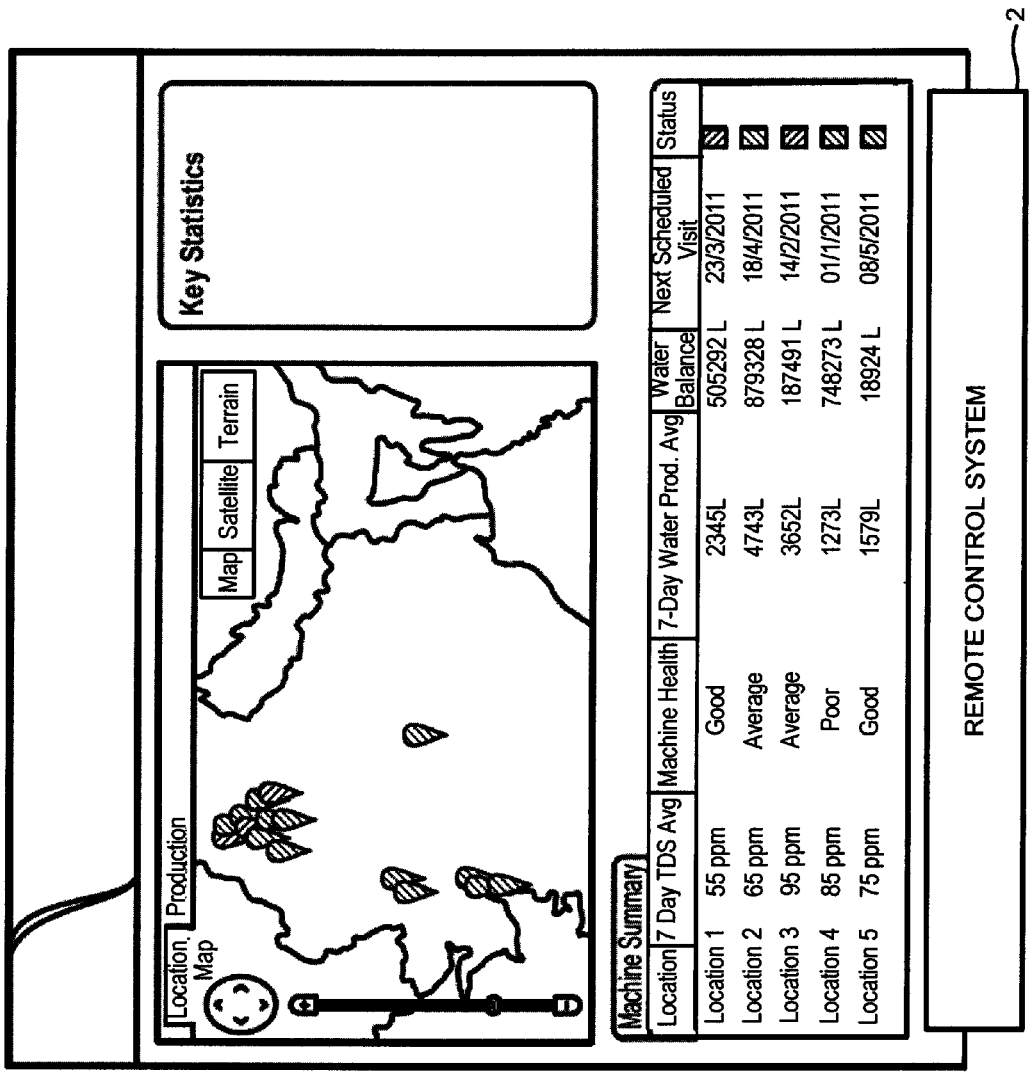
Figure 4:
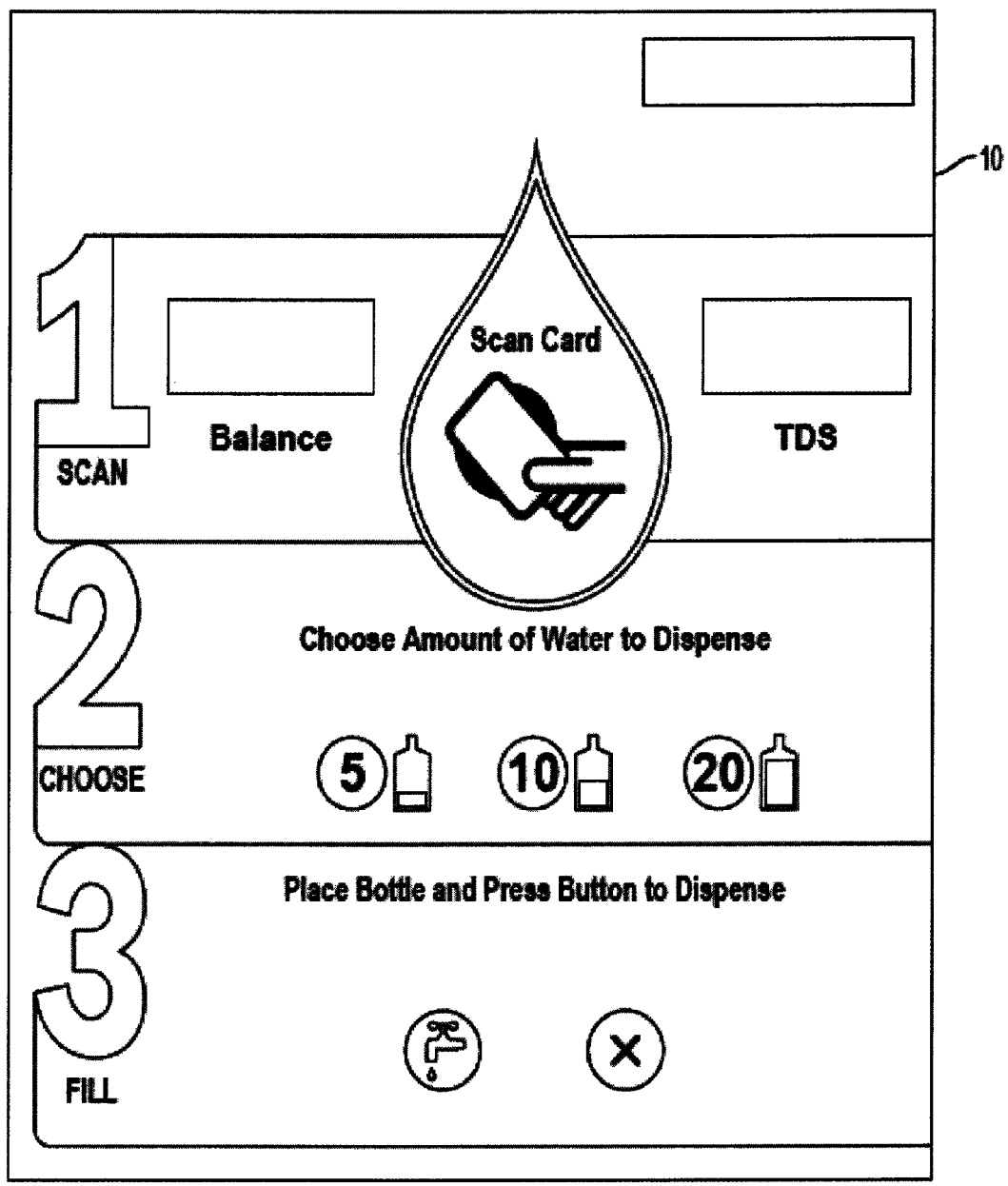
FIG. 4 is a schematic illustration of the user interface of the point of sale device.

Referring to FIGS. 3A, 3B and 4, a user of the water distribution system (1) may pay for the water by pre paid cards or coins or other similar systems. Details of user accounts including user balances are stored at the remote control system (2). A user performs a transaction at the point of sale device (8) of the water distribution system (1) using the user interface (10). The user interface (10) includes a payment module to receive payment for the water to be dispensed. The point of sale device (8) processes the user transaction at the remote control system (2) and on a successful processing of user payment the service management device (9) is instructed to dispense the quantity of water for which payment is received. The service management device (9) dispenses the desired quantity of water if the quality standards are met. By way of specific example, a user may access the user interface (10), provide his account details by swiping his account card, inserting a coin or conducting a mobile payment transaction, and select the quantity of water to be dispensed for example 500 ml, 1 liter, 5 liter, 10 liter, 20 liter etc. The point of sale device (8) transmits the transaction details to the remote control system (2) to verify the user balance and on receiving authorization, water is dispensed by the water dispenser (5). When the transaction is complete, the point of sale device (8) transmits corresponding data to the remote control system (2).

In accordance with an embodiment, the user interface (10) is connected to the point of sale device (8) by means of hard wires or by wireless means such as Bluetooth®. The user interface (10) may also be configured to allow a user to add balance or change user account settings by appropriate modules.

The point of sale device (8) acts as a services backbone to the water distribution system (1). Other devices connect to it and users interface with it. There can be multiple payment gateways connected to the same point of sale device (8). In one example, a payment must be complete before the transaction can occur. This pre-paid mechanism enforces collection on services.

In accordance with an embodiment, the remote control system (2) receives data from the user interface (10) of the point of sale device (8) and transmits instructions to the point of sale device (8) to adjust the operation settings of the service management device (9). The remote control system (2) transmits instructions to the point of sale device (8) to stop dispensing of water if the value of total dissolved solid in water measured by the service management device (9) is outside the predetermined range. The remote control system (2) may also transmit instructions to the point of sale device (8) to stop dispensing of water if a tampering is detected or in the event of a malfunction. By way of specific example, the instructions sent by the remote control system (2) includes changing settings of service management device (9), changing balance of the prepaid production credit, enabling or disabling the sensors or software updates.

In accordance with an aspect, the communication gateway (11) enables communication between the water distribution system (1) and the remote control system (2). The communication gateway (11) transmits data obtained from the sensor system (7) of the control unit (6) to the remote control system (2). The communication gateway (11) receives instructions from the remote control system (2) and transmits the same to the control unit (6) for the operation of the water filtration unit (3). The communication gateway (11) also transmits data obtained from the point of sale device (8) to the remote control system (2) and receives instructions from the remote control system (2) for dispensing of water on successful processing of user payment or for alteration of settings of the service management device (9).

In accordance with an embodiment, the communication gateway (11) includes modem capable of GSM, CDMA, Wi-Fi, GPRS, Zigbee, wired internet or wireless communication protocol. The communication gateway (11) enables the communication between the remote control system (2) and one or more components of the water distribution system (1) by transmitting data by means of messages.

In accordance with an embodiment, the water distribution system (1) may comprise of a power source (12) for the point of sale device (8) and the control unit (6). The power source (12) may be any suitable source such as plug in power, batteries or may include a renewable energy source such as solar power. A common power source (12) may be provided for the point of sale device (8) and the control unit (6), as illustrated in the embodiment of FIG. 1, or independent power sources (12) may be provided. The power source (12) also preferably includes some back up or fail over power source (12). By way of specific example, the primary power source (12) may be a direct plug in power, with solar power as the first fail over and the batteries as the second fail over.

In accordance with an alternate embodiment, the control unit (6) and the point of sale device (8) may be configured with independent communication modules for communication with the remote control unit (2). Referring to FIG. 2, the control unit (6) communicates with the remote control system (2) through a communication module (13) and the point of sale device (8) communicates with the remote control system (2) through a communication module (14).

The communication module (13) enables the communication between the control unit (6) and the remote control system (2). The communication module (13) transmits data obtained from the sensor system (7) to the remote control system (2) and receives instructions from the remote control system (2) for the operation of the water filtration unit (3). Similarly, the communication module (14) enables communication between the point of sale device (8) and the remote control system (2).

In accordance with an embodiment, the communication module (13) of the control unit (6) and the communication module (14) of the point of sale device (8) includes modem capable of GSM, CDMA, Wi-Fi, GPRS, Zigbee, wired internet or wireless communication protocol.

Specific Embodiments are Described Below

A water distribution system configured for control by a remote control system comprises of a water filtration unit for filtering water, a water storage unit for storing the filtered water and including a water dispenser, a control unit configured to control the operation of the water filtration unit and including a sensor system to measure the quality and quantity of the water filtered and to monitor the functioning of one or more components of the water filtration unit, a point of sale device comprising a service management device mounted on the water storage unit and configured to control the operation of the water dispenser and a user interface to receive user inputs and configured to process user payments for the dispensing of water at the remote control system and a communication gateway enabling communication between the water distribution system and the remote control system such that the water distribution system configured to transmit data obtained from the sensor system and the user interface to the remote control system and the water distribution system further configured to receive instructions for the operation of the water filtration unit from the remote control system and to receive instructions for dispensing of water on successful processing of user payment.

Such water distribution system(s), wherein the service management device includes a sensor to measure the quality of water. The sensor could for example measure the total dissolved solids in the dispensed water.

Such water distribution system(s), wherein the point of sale device is configured to stop dispensing of water by the water dispenser if the quality of water such as that measured by the total dissolved solids measured by the service management device is outside a predetermined range of total dissolved solids.

Such water distribution system(s), wherein the communication gateway includes a modem capable of any GSM, CDMA, Wi-Fi, GPRS, wired internet or any wired or wireless communication protocol.

Such water distribution system(s) further comprises of a power source for the control unit and the point of sale device. The power source may be a common or independent for the control unit and the point of sale device.

Such water distribution system(s), wherein the control unit is configured to stop operation of the water filtration unit on receiving instructions from the remote control system.

Such water distribution system(s), wherein the control unit is configured to adjust operation settings of the water filtration unit on receiving instructions from the remote control system.

Such water distribution system(s), wherein the point of sale device is configured to adjust operation settings of the service management device on receiving instructions from the remote control system.

Such water distribution system(s), wherein the sensor system includes one or more of a flow sensor, a conductivity sensor, a spectrometer or a pressure sensor.

Such water distribution system(s), wherein the service management device includes a filtration system for filtering water before dispensing.

Such water distribution system(s), wherein the water filtration unit is located remotely from the water storage unit.

Further Specific Embodiments are Described Below

A water distribution system configured for control by a remote control system comprises of a water filtration unit for filtering water, a water storage unit for storing the filtered water and including a water dispenser, a control unit configured to control the operation of the water filtration unit and comprises of a sensor system to measure the quality and the quantity of the water filtered and to monitor the functioning of one or more components of the water filtration unit, a communication module for communication with the remote control system and configured to transmit data obtained from the sensor system to the remote control system and to receive instructions for the operation of the water filtration unit from the remote control system, and a point of sale device comprises of a service management device mounted on the water storage unit and configured to control the operation of the water dispenser, a communication module for communication with the remote control system, and a user interface to receive user inputs and configured to process user payments for the dispensing of water at the remote control system through the communication module such that the point of sale device is configured to instruct the service management device to dispense water through the water dispenser on successful processing of user payment.

A system for distribution of water comprises of a remote control system for collecting data and aggregating information from one or more remotely located water distribution system in communication with the remote control system, a water filtration unit for filtering water, a water storage unit for storing the filtered water and including a water dispenser, a control unit configured to control the operation of the water filtration unit and including a sensor system to measure the quality and the quantity of the water filtered, and to monitor the functioning of one or more components of the water filtration units point of sale device comprises of a service management device mounted on the water storage unit and configured to control the operation of the water dispenser and a user interface to receive user inputs and configured to process user payments for the dispensing of water at the remote control system and a communication gateway enabling communication between the water distribution system and the remote control system; such that the water distribution system configured to transmit data obtained from the sensor system and the user interface to the remote control system, and the water distribution system further configured to receive instructions for the operation of the water filtration unit from the remote control system, and to receive instructions for dispensing of water on successful processing of user payment.

INDUSTRIAL APPLICABILITY

The disclosed system provides high level quality assurance of water services in rural as well as urban areas and is robust enough to meet the increasing demand of good quality of potable water. The system is inexpensive, easy to transport and install. The system is also capable of an off grid implementation not requiring external electricity, piping or infrastructure other than a water tank.

The ability to control the water distribution system remotely including calibration and remote diagnosis significantly improves operational effectiveness. Moreover, the distributed model allows health trip points to be set up. The distributed model also ensures general availability of potable water for minimal infrastructure installations and thus resulting in a lower environmental impact.

It would be possible by way of present disclosure to provide a system for automatic revenue collection which results in elimination of personnel to be present at cash desk for collecting payments for the water supplied. Importantly, the system is capable of providing an automatic preventive maintenance through a remote control system. The system is more efficient in terms of reducing dependency on man power.

The system can be applied in rural as well as urban areas and favours substantial financial savings due to its simpler architecture and advance means of communication.

We claim:

1. A system comprising:
a remote control system; and
a water distribution system located remote from the remote control system, comprising:
   a water filtration unit for filtering water, the water filtration unit including one or more adjustable water filtration components;
   a water storage unit for storing water filtered by the water filtration unit, the water storage unit including a water dispenser;
   a control unit configured to control the operation of the water filtration unit by adjusting the one or more adjustable water filtration components to bring monitored water quality parameters within desired settings, the control unit including a sensor system to measure the quality and the quantity of the water filtered by the water filtration unit, and to monitor the functioning of the one or more adjustable water filtration components of the water filtration unit and monitor the water quality parameters;
   a point of sale device comprising (a) and (b):
      (a) a service management device coupled to the water storage unit and configured to control the operation of the water dispenser; and
      (b) a user interface to receive user inputs and configured to process user payments for the dispensing of water at the remote control system; and
   a communication gateway enabling remote communication between the water distribution system and the remote control system; such that the water distribution system is configured to transmit data obtained from the sensor system and the user interface to the remote control system, and the water distribution system is further configured to receive instructions for the operation of the water filtration unit from the remote control system, and to receive instructions for dispensing of water on successful processing of user payment.

2. A system as claimed in claim 1 wherein the service management device includes one or more of a sensor to measure the quality of water, total dissolved solids in the dispensed water, a flow sensor, a conductivity sensor, a spectrometer, a pressure sensor, or a filtration sensor.

3. A system as claimed in claim 2 wherein the point of sale device is configured to stop dispensing of water by the water dispenser if measurements from one or more of the sensors tracked by the service management device is outside a predetermined range.

4. A system as claimed in claim 1 wherein the communication gateway includes a modem capable of any of GSM, CDMA, Wi-Fi, GPRS, Zigbee, wired internet or any wired or wireless communication protocol.

5. A system as claimed in claim 1 further comprising a power source for the control unit and the point of sale device.

6. A system as claimed in claim 1 wherein the control unit is configured to stop or start operation of the water filtration unit on receiving instructions from the remote control system.

7. A system as claimed in claim 1 wherein the control unit is configured to receive instructions from the remote control system for adjusting operation settings of the water filtration unit by adjusting the one or more adjustable water filtration components.

8. A system as claimed in claim 1 wherein the point of sale device is configured to adjust operation settings of the service management device on receiving instructions from the remote control system.

9. A system as claimed in claim 1 wherein the sensor system includes one or more of a flow sensor, a conductivity sensor, a spectrometer or a pressure sensor.

10. A system as claimed in claim 1 wherein the service management device includes a filtration system, separate from the water filtration unit, for filtering the water exiting the water storage unit.

11. A system as claimed in claim 1 wherein the water filtration unit is located remotely from the water storage unit.

12. A water distribution system configured for control by a remote control system, the water distribution system comprising:
   a water filtration unit for filtering water;
   a water storage unit for storing the filtered water and including a water dispenser;
   a control unit configured to control the operation of the water filtration unit and comprising:
      a sensor system to measure the quality and the quantity of the water filtered and to monitor the functioning of one or more components of the water filtration unit, wherein the sensor system monitors parameters of the water filtration unit;
      a communication module for communication with the remote control system and configured to transmit data obtained from the sensor system to the remote control system and to receive instructions for the operation of the water filtration unit from the remote control system, wherein the control unit is configured to adjust the one or more components of the water filtration unit to bring the parameters of the water filtration unit to desired settings based on instructions received from the remote control system; and
   a point of sale device comprising:
      a service management device mounted on the water storage unit and configured to control the operation of the water dispenser;
      a communication module for communication with the remote control system, and
      a user interface to receive user inputs and configured to process user payments for the dispensing of water at the remote control system through the communication module;
      such that the point of sale device is configured to instruct the service management device to dispense water through the water dispenser on successful processing of user payment.

13. A water distribution system as claimed in claim 12 wherein the service management device includes one or more of a sensor to measure the quality of water, total dissolved solids in the dispensed water, a flow sensor, a conductivity sensor, a spectrometer, a pressure sensor, or a filtration sensor.

14. A water distribution system as claimed in claim 13 wherein the point of sale device is configured to stop dispensing of water by the water dispenser if measurements from one or more of the sensors tracked by the service management device is outside a predetermined range.

15. A water distribution system as claimed in claim 12 wherein the communication modules of the control unit and the point of sale device include modems capable of any of GSM, CDMA, Wi-Fi, GPRS, Zigbee, wired internet or any wired or wireless communication protocol.

16. A water distribution system as claimed in claim 12 further comprising a power source for the control unit and the point of sale device.

17. A water distribution system as claimed in claim 12 wherein the control unit is configured to stop or start operation of the water filtration unit on receiving instructions from the remote control system.

18. A water distribution system as claimed in claim 12 wherein the point of sale device is configured to adjust operation settings of the service management device on receiving instructions from the remote control system.

19. A water distribution system as claimed in claim 12 wherein the sensor system includes one or more of a flow sensor, a conductivity sensor, a spectrometer or a pressure sensor.

20. A water distribution system as claimed in claim 12 wherein the service management device includes a filtration system, separate from the water filtration unit, for filtering the water before dispensing.

21. A water distribution system as claimed in claim 12 wherein the water filtration unit is located remotely from the water storage unit.

22. A system for distribution of water comprising:
   a remote control system for collecting data and aggregating information from one or more remotely located water distribution system in communication with the remote control system;
   a water filtration unit having one or more adjustable water filtration components for filtering water;
   a water storage unit for storing water filtered by the water filtration unit, the water storage unit including a water dispenser;
   a control unit configured to control the operation of the water filtration unit by adjusting the one or more adjustable water filtration components to bring monitored water quality parameters within desired settings, the control unit including a sensor system to measure the quality and the quantity of the water filtered by the water filtration unit, and to monitor the functioning of one or more components of the water filtration unit and monitor the water quality parameters;
   a point of sale device comprising (a) and (b):
      (a) a service management device coupled to the water storage unit and configured to control the operation of the water dispenser; and
      (b) a user interface to receive user inputs and configured to process user payments for the dispensing of water at the remote control system; and
   a communication gateway enabling communication between the water distribution system and the remote control system; such that the water distribution system configured to transmit data obtained from the sensor system and the user interface to the remote control system, and the water distribution system further configured to receive instructions for the operation of the water filtration unit from the remote control system, and to receive instructions for dispensing of water on successful processing of user payment.

\* \* \* \* \*